(12) United States Patent
Taniuchi et al.

(10) Patent No.: US 9,604,437 B2
(45) Date of Patent: Mar. 28, 2017

(54) METHOD FOR MANUFACTURING STRUCTURAL BODY AND MANUFACTURING APPARATUS THEREFOR

(71) Applicant: CANON KABUSHIKI KAISHA, Tokyo (JP)

(72) Inventors: Hiroshi Taniuchi, Yokohama (JP); Kazuhiro Nakajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 34 days.

(21) Appl. No.: 14/651,162

(22) PCT Filed: Dec. 12, 2013

(86) PCT No.: PCT/JP2013/084001
§ 371 (c)(1),
(2) Date: Jun. 10, 2015

(87) PCT Pub. No.: WO2014/092205
PCT Pub. Date: Jun. 19, 2014

(65) Prior Publication Data
US 2015/0314578 A1 Nov. 5, 2015

(30) Foreign Application Priority Data
Dec. 13, 2012 (JP) ................................ 2012-272625

(51) Int. Cl.
*B32B 37/00* (2006.01)
*B29C 67/00* (2006.01)
*B32B 37/26* (2006.01)

(52) U.S. Cl.
CPC ...... *B32B 37/0046* (2013.01); *B29C 67/0059* (2013.01); *B29C 67/0074* (2013.01);
(Continued)

(58) Field of Classification Search
CPC ... B32B 37/00; B32B 37/004; B32B 37/0046; B32B 37/02; B32B 37/025;
(Continued)

(56) References Cited

U.S. PATENT DOCUMENTS 5,301,415 A * 4/1994 Prinz ...................... B22F 3/115
 118/313
6,245,249 B1 * 6/2001 Yamada ................ B81C 99/008
 134/1.1
(Continued)

FOREIGN PATENT DOCUMENTS

CN 1784460 A 6/2006
EA 016201 B1 3/2012
(Continued)

*Primary Examiner* — Michael N Orlando
*Assistant Examiner* — Matthew Hoover
(74) *Attorney, Agent, or Firm* — Canon U.S.A. Inc., IP Division

(57) ABSTRACT

A method for manufacturing a structural body includes a lamination step of, while an in-process structural body is supported by a support member, laminating a plurality of times, a layer which is provided on a surface of a transfer member and which is to be formed into the structural body on the in-process structural body or at least a part of a surface formed of the in-process structural body and the support member, and in the lamination step, the support member is moved by changing the state thereof.

19 Claims, 12 Drawing Sheets

(52) U.S. Cl.
CPC ........ *B29C 67/0092* (2013.01); *B32B 37/025* (2013.01); *B32B 37/26* (2013.01); *B32B 2037/268* (2013.01); *B32B 2307/748* (2013.01); *B32B 2310/0806* (2013.01); *Y10T 156/17* (2015.01)

(58) Field of Classification Search
CPC ......... B32B 37/20; B32B 37/26; B29C 67/00; B29C 67/005; B29C 67/0059; B29C 67/007; B29C 67/0074; B29C 67/009; B29C 67/0092
See application file for complete search history.

(56) References Cited

U.S. PATENT DOCUMENTS

| | | |
|---|---|---|
| 2005/0161146 A1 | 7/2005 | Graf |
| 2012/0231175 A1* | 9/2012 | Tan ................ B29C 67/0074 427/469 |

FOREIGN PATENT DOCUMENTS

| | | |
|---|---|---|
| JP | 8-057967 A | 3/1996 |
| JP | 8-281808 A | 10/1996 |
| JP | 9-272153 A | 10/1997 |
| JP | H10-207194 A | 8/1998 |
| JP | 10-305488 A | 11/1998 |
| JP | 2010-012736 A | 1/2010 |
| JP | 2012-040726 A | 3/2012 |
| JP | 2012-096430 A | 5/2012 |
| RU | 2375182 C2 | 12/2009 |
| WO | 95/26871 A1 | 10/1995 |
| WO | 03/049926 A2 | 6/2003 |

\* cited by examiner

METHOD FOR MANUFACTURING STRUCTURAL BODY AND MANUFACTURING APPARATUS THEREFOR

TECHNICAL FIELD

The present invention relates to a method for manufacturing a structural body and a manufacturing apparatus therefor.

BACKGROUND ART

In recent years, formation of three-dimensional objects each having a complicated shape designed by a computer has become widespread. In the fields in which many types of products, such as mechanical micro-components and display samples of housing and foods, are produced in a relatively small quantity, the formation of three-dimensional objects as described above has been increasingly in demand.

As one example of a method for forming the three-dimensional object as described above, a method has been known in which a material to be formed into a three-dimensional object is repeatedly laminated to manufacture a structural body.

According to PTL 1, a method has been disclosed in which after a layer having a shape of a part of a three-dimensional object is formed, patterning is performed by providing a material which is used as a support so as to surround the layer described above. After a support member is formed as described above, a surface formed of this support member and an in-process three-dimensional object is then planarized, and a material to be formed into the three-dimensional object is further laminated on the surface thus planarized.

CITATION LIST

Patent Literature

[PTL 1]
Japanese Patent Laid-Open No. 10-305488

SUMMARY OF INVENTION

Technical Problem

However, according to the method disclosed in PTL 1, since the support member is formed every time when a layer to be formed into the three-dimensional object is laminated, and a large amount of a material forming the support member is required, and in addition, since the case is considered in which each layer and the support member are required to be precisely disposed at respective predetermined positions and/or the support member cured in a step of laminating layers is difficult to be removed and cannot be recycled, the load onto the manufacturing is expected to be high.

Solution to Problem

Accordingly, the present invention provides a method capable of manufacturing a structural body with a high production efficiency while the amount of a material forming a support member is reduced.

A method for manufacturing a structural body according to one aspect of the present invention comprises: a lamination step of, while an in-process structural body is supported by a support member, laminating a plurality of times, a layer which is provided on a surface of a transfer member and which is to be formed into the structural body on the in-process structural body or at least a part of a surface formed of the in-process structural body and the support member, and in the lamination step described above, the state of the support member is changed to move the support member.

Further features of the present invention will become apparent from the following description of exemplary embodiments with reference to the attached drawings.

Advantageous Effects of Invention

According to the present invention, a manufacturing method can be provided in which since the support member is softened and is then moved, while the amount of a material forming a new support member is reduced, the structural body is manufactured with a high production efficiency.

DESCRIPTION OF EMBODIMENT

With reference to the drawings, an embodiment of the present invention will be described.

Figure 3:
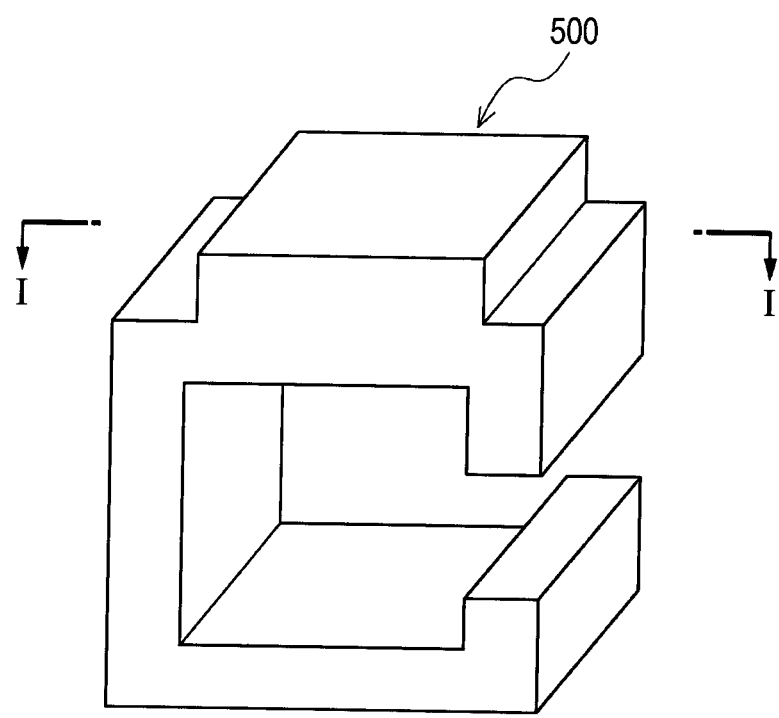
FIG. 3 is a schematic perspective view showing one example of a structural body manufactured by the method for manufacturing a structural body according to the embodiment.

FIG. 3 is a perspective view schematically showing one example of a structural body manufactured by a method for manufacturing a structural body according to the embodiment of the present invention. A structural body 500 having a three-dimensional structure as described above is manufactured by a method, which will be described later, using a structural material such as a plastic, a metal, or the like. The method for manufacturing a structural body according to the embodiment of the present invention may be used when components of electrical devices, toy models, such as dolls and plastic models, food samples, display models for sales promotion of housing and furniture, and the like are manufactured as structural bodies.

Figure 1:
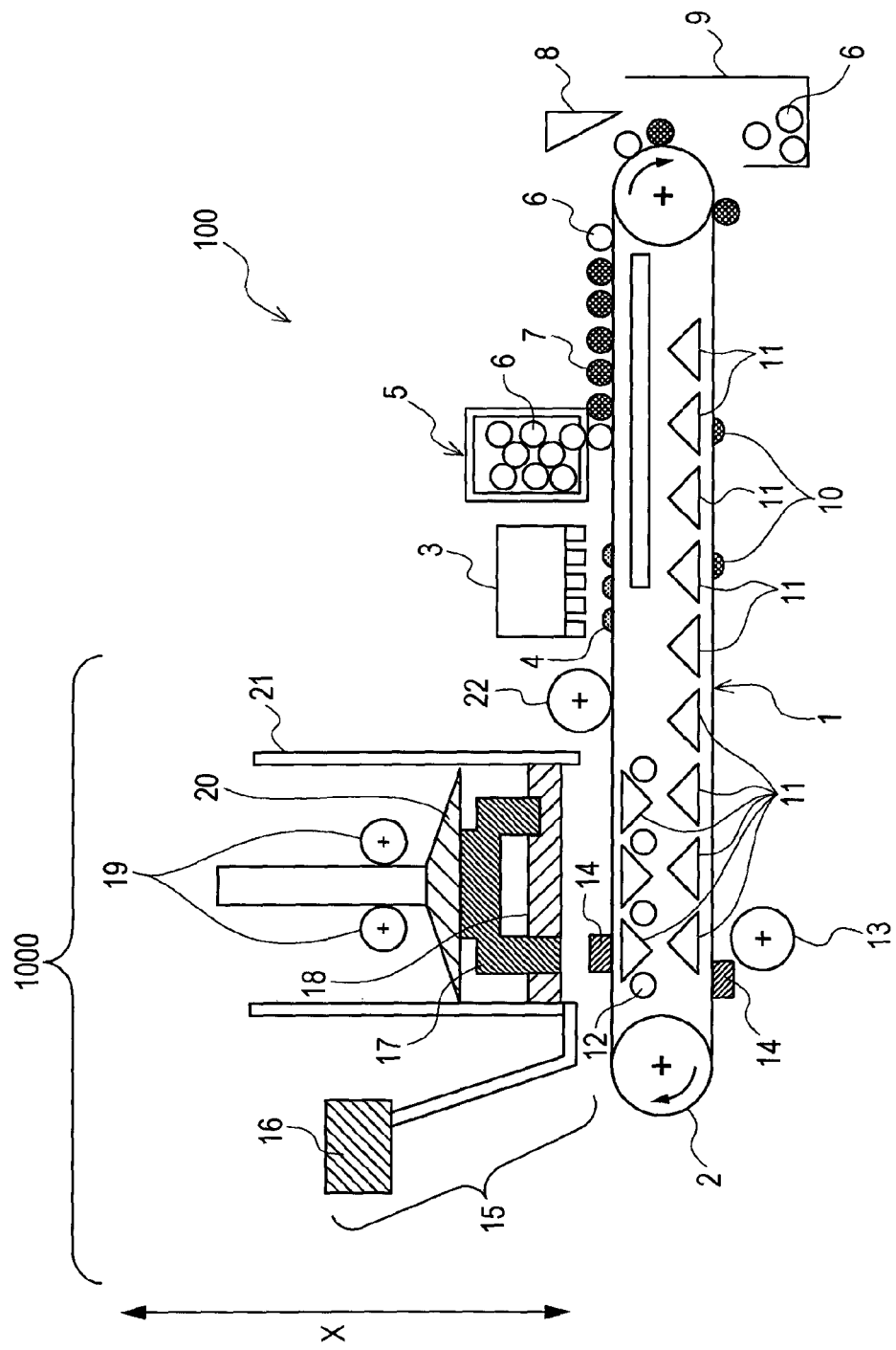
FIG. 1 is a schematic view showing a laminate forming apparatus as one example of a manufacturing apparatus realizing a method for manufacturing a structural body according to an embodiment.

FIG. 1 is a view schematically showing a laminate forming apparatus as one example of a manufacturing apparatus realizing the method for manufacturing a structural body according to the embodiment of the present invention and is a cross-sectional view schematically showing the state of a manufacturing process along the line I-I of FIG. 3 along which the structural body is cross-sectioned. In an apparatus 100 having the cross section shown in FIG. 1, a pattern of a layer of the structural body which is to be newly laminated is formed on a surface of a belt-shaped intermediate transfer member 1 functioning as a transfer member and is then allowed to pass through each process unit by a transport mechanism 2, so that a cross-sectional layer 14 having a cross-sectional shape of the structural body is formed. In addition, the cross-sectional layer 14 of the structural body is transported to a lamination position of a lamination unit 1000 which is reciprocally moved in an X direction and is then laminated on a laminated in-process structural body 17.

A shape forming process in the apparatus 100 starts from an ink jet unit 3 arranged at the center of the apparatus 100. A pattern 4 is formed by ink dots on the intermediate transfer member 1 located under the ink jet unit 3. Next, a shape forming material 6 is applied to the pattern 4 formed of the ink from a shape forming material supply mechanism 5 to form a mixture 7, so that the shape forming material 6 is fixed on the surface of the intermediate transfer member 1. The material may be applied in the form of a powder finer than required resolution, and a material which can be formed into a film in some way may be used. For example, a thermoplastic resin which can be formed into a film by a heating treatment may be used in the form of a powder, or glass beads or a powdered metal may also be used when an adhesive which is used to form a film is blended with the pattern 4 described above. Among those described above, since being light weight and capable of forming a robust structural body, a thermoplastic resin is particularly preferable.

The intermediate transfer member 1 functions as a support member supporting a layer of the structural body formed on the surface and also functions as a transfer member transferring a formed layer to an in-process structural body which is already formed by laminating layers to each other. Hence, the transfer member 1 is preferably formed of a material having a high release property while having an affinity to some extent to a material forming the structural body. In addition, in order to stably perform the transfer, the intermediate transfer member 1 preferably has at least elasticity to some extent. As a preferable material for the intermediate transfer member, for example, a silicone rubber and a fluorinated rubber may be mentioned. Since a material used for patterning may be repelled in some cases on those rubber materials mentioned above, it is more preferable to perform a surface treatment thereon in accordance with the material to be used. Although the rubber hardness is determined depending on the thickness of an elastic body, when the thickness thereof is large, a hard rubber is preferably used, and when the thickness is small, a soft rubber is preferably used. When the thickness is large, a rubber having a hardness of approximately 80 degrees is preferable, and when the intermediate transfer member 1 has a thin belt shape, a thin film formed of a rubber having a thickness of approximately 0.1 to 0.5 mm and a rubber hardness of approximately 50 to 20 degrees is preferably used. When a high accuracy is required, although a Teflon (registered trademark) sheet and a smooth film coated with a release agent having a submicron-order thickness, each of which has no elasticity, are preferably used, since a machine accuracy and/or a long process time may be required in some cases, the material is preferably selected in accordance with the application purpose. In addition, when a metal powder or the like is used as the shape forming material, the surface thereof is preferably processed by a release treatment using boron nitride or the like having a high heat resistance.

In the apparatus shown in FIG. 1, the ink jet unit 3 is shown as one example of a device used for forming a layer of the structural body on the intermediate transfer member 1. A method for forming a layer of the structural body using an ink jet method is, as described later, a method in which a shape forming material forming the structural body is applied onto a semiliquid pattern drawn with an ink on the surface of the intermediate transfer member to increase the volume and to form a colored solid layer. However, the method is not limited to that described above, and for example, an image may also be formed by patterning using a digital recording device of an electronic photographic method, a dispenser method, or the like, or a printing plate method, such as offset printing or screen printing. In the case of an electronic photographic method using a dry toner, an adhesive force is generated in the toner by heating. Among those described above, when an intermediate transfer member having a high release property is used, an ink jet method is a very preferable method since various colors can be simultaneously patterned without being in contact with the intermediate transfer member 1. In addition, instead of using a method in which after an image is formed on the surface of the intermediate transfer member 1, a material of the structural body is applied to the image, a layer of the structural body may be formed by directly applying a component to be solidified, such as a resin material, to the surface of the intermediate transfer member 1 by an ink jet method or the like. By the method as described above, the supply mechanism 5 which only functions to supply the shape forming material 6 is not required, and hence, the size of the shape forming apparatus can be reduced. In the method in which a pattern is drawn on the surface of the intermediate transfer member 1, and a shape forming material forming a solid component is then applied to the pattern, an ink jet method is preferably used to draw a pattern. The reason for this is that since the solid component of an ink-jet ink is almost formed from colorants, a solvent component can be removed by evaporation after the shape forming material 6 is fixed.

In the apparatus shown in FIG. 1, although the shape forming material is supplied after an ink pattern is formed, the order of steps is not limited thereto. For example, first, a powder used as the shape forming material 6 is supplied onto the intermediate transfer member 1, and an ink then may be applied to the powder. As long as the shape forming material 6 is fixed on the surface of the intermediate transfer member 1 in accordance with a desired pattern, the order of steps is not particularly limited.

Next, a part of the shape forming material 6 is removed which is not fixed since being adhered to the outside of the ink pattern provided on the intermediate transfer member 1. Since the part of the shape forming material 6 which is not in contact with the ink pattern has a low adhesion to the intermediate transfer member 1, when transported by a transport device to the vicinity of an air knife 8 which ejects a gas, the part of the shape forming material 6 is peeled away by the pressure of wind sent from the air knife 8, is separated from the fixed mixture 7, and is then transported to a removed structural material receiver 9. When the shape forming material 6 is a resin powder, since a resin powder is liable to be electrified with static, a static eliminator is preferably used.

The formation of the mixture 7 and the removal of the shape forming material 6 may not be performed sequentially but simultaneously. For example, when wind is sent to the pattern 4 formed of an ink, and the shape forming material 6 is blown with the wind thus sent, since a part of the shape forming material 6 which is not brought into contact with the pattern 4 is not fixed to the surface of the intermediate transfer member 1, an unnecessary shape forming material 6 can be removed.

Figure 8:
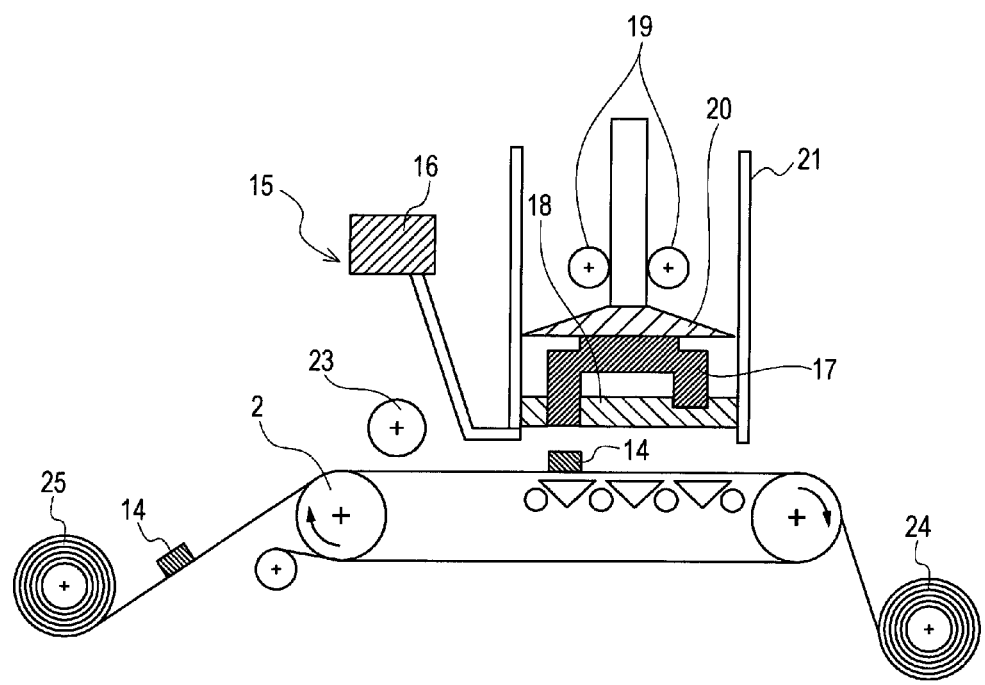
FIG. 8 is a schematic view showing a laminate forming apparatus as one example of a manufacturing apparatus realizing a method for manufacturing a structural body according to an embodiment.

The mixture 7 of the shape forming material 6 and the pattern 4 of the ink remaining on the intermediate transfer member 1 is heated by heaters 11 arranged at a rear surface side of the intermediate transfer member, and as a liquid component is evaporated, the volume of the mixture 7 is decreased and melted as shown by reference numeral 10 in the drawing, so that a film is formed. If necessary, the surface of the mixture 7 is planarized by a heat roller 13, so that the cross-sectional layer 14 is formed which forms a part of the structural body and which has a surface shape equivalent to a cross-sectional shape of the structural body. In this case, the surface shape of the cross-sectional layer 14 is a cross-sectional shape obtained when a completed structural body is cross-sectioned along a direction perpendicular to a lamination direction. The cross-sectional layer 14 is transported under a shape forming table 20 of the lamination unit 1000 and is aligned with an in-process structural body by an alignment device (not shown). Next, the lamination unit 1000 including a shape forming container 21, the shape forming table 20, a lift mechanism 19, and a support member filling mechanism 15 is lowered, and hence, the cross-sectional layer 14 is laminated on the surface formed of the in-process structural body 17 and a support member 18 which is a support member supporting the in-process structural body 17. The support member filling mechanism 15 provided in the lamination unit functions to fill the support member 18. In addition, in FIG. 1, although a device patterning a shape forming material is provided in the apparatus, the apparatus is not limited thereto. In an apparatus shown in FIG. 8 by way of example, shape formation is performed by fitting an intermediate transfer sheet 25 on which a shape forming material is patterned in advance by another patterning device to a lamination device. Since the patterning step by the another patterning device and the lamination step by the lamination device can be performed in parallel, and in addition, since the loss time can be reduced even if the tact times of the respective steps are different from each other, the productivity can be significantly improved. In FIG. 8, reference numeral 23 indicates an adhesive application mechanism which functions to apply an adhesive to the cross-sectional layer 14. In addition, reference numeral 24 indicates a used intermediate transfer sheet. The remaining structure in the lamination device is similar to that described in the lamination unit shown in FIG. 1. The present invention relates to a lamination process in which patterning is not always necessarily performed on an in-process structural body unlike related many three-dimensional shape forming methods, and in other words, a patterning mechanism is not always necessarily provided in the same apparatus. In the present invention, cross-sectional patterns manufactured under optimum conditions for respective methods and materials can be used. That is, in accordance with a material to be used for the structural body and the shape forming accuracy thereof, the patterning device may be selected without so much limited.

Figure 4:
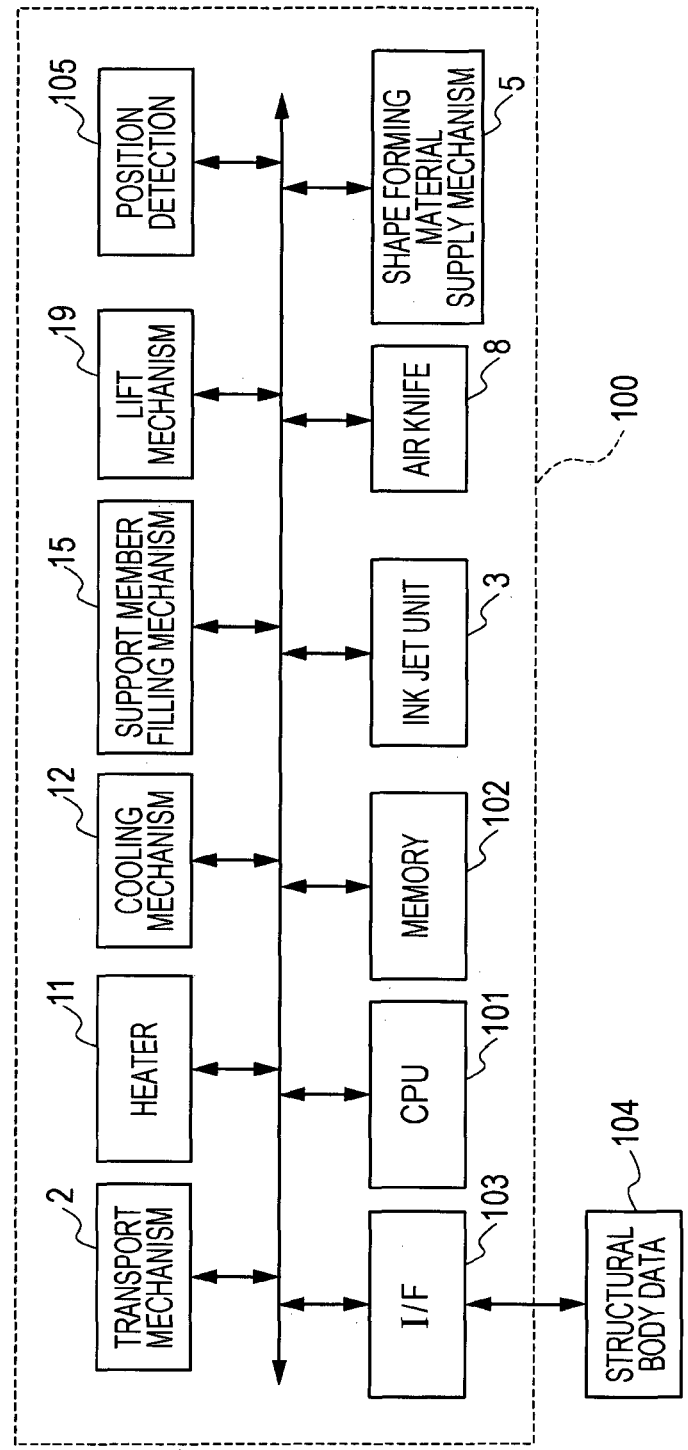
FIG. 4 is a block diagram showing a control system of the manufacturing apparatus.

FIG. 4 is a block diagram showing a control system of the manufacturing apparatus 100 shown in FIG. 1. In the three-dimensional object forming apparatus entirely represented by reference numeral 100, reference numeral 101 indicates a CPU which functions as a major control portion of the entire system and controls individual units. Reference numeral 102 indicates a memory which is formed, for example, of ROMs storing a basic program of the CPU 101 and RAMs used to store a structural body data 104 inputted through an interface 103 and to perform data processing. When the CPU 101 receives a signal indicating the start of shape formation, a process converting the structural body data into a slice data which is outputted in accordance with setting conditions is started, and at the same time, communication is performed to confirm the states of the transport mechanism 2, the ink jet unit 3, the shape forming material supply mechanism 5, the support member filling mechanism 15, and the lift mechanism 19. When the states are ready to start the shape formation, the transport mechanism 2 and the lift mechanism 19 are moved to respective predetermined positions in accordance with the information of a position detection 105, and an ejection signal is sent to the ink jet unit 3, so that the shape formation is started.

Next, with reference to FIGS. 2A to 2J, 5A and 5B, and 6A to 6H besides FIGS. 1, 3, and 4, the flow of lamination steps will be described. FIGS. 2A to 2J, 5A and 5B, and 6A to 6H are cross-sectional views each showing a step of a lamination process in the lamination unit 1000 when viewed from the same cross-sectional position as that in FIG. 1.

In addition, in FIG. 2A to 2J, the lamination unit 1000 is shown while the lift mechanism 19 is omitted. In addition, in FIGS. 2A to 2J, 5A and 5B, and 6A to 6H, parts of the mechanisms of the lamination unit 1000, the heaters, and cooling mechanisms may be omitted in some cases.

Figure 2A:
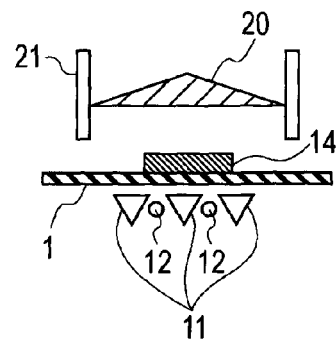
FIG. 2A is a schematic cross-sectional view showing the state of a step of a lamination process in a lamination unit according to the embodiment.

Next, as shown in FIG. 2A, a cross-sectional layer 14 on the surface of the intermediate transfer member 1 is prepared at a position facing the shape forming table 20.

Figure 2B:
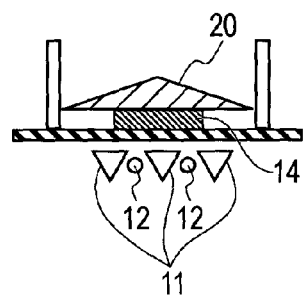
FIG. 2B is a schematic cross-sectional view showing the state of a step of the lamination process in the lamination unit according to the embodiment.

Next, as shown in FIG. 2B, the shape forming table 20 is lowered so that the distance between a transfer surface (the surface of the forming table when a first layer is formed) and the intermediate transfer member becomes close to a predetermined value and so that the cross-sectional layer 14 in a molten state is brought into contact with the transfer surface of the shape forming table 20, and as a result, the thickness of the cross-sectional layer 14 is controlled. Before the surface of the shape forming table 20 is brought into contact with the cross-sectional layer 14, or while the surface of the shape forming table 20 is in contact therewith, the cross-sectional layer may be softened with heaters 11 so as to promote melting of the cross-sectional layer.

Figure 2C:
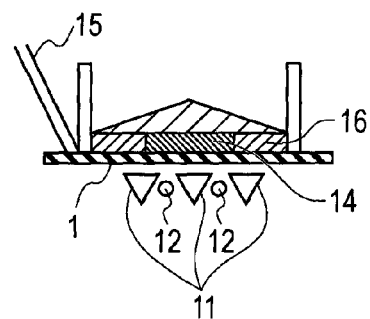
FIG. 2C is a schematic cross-sectional view showing the state of a step of the lamination process in the lamination unit according to the embodiment.

Next, as shown in FIG. 2C, into a space between the transfer surface (bottom surface) of the shape forming table 20 and the intermediate transfer member 1, a support material 16 in a molten state, which forms the support member 18, is injected by the support member filling mechanism 15. The support material 16 is brought into contact with the surface of the intermediate transfer member 1 as is the cross-sectional layer 14.

As the support material 16 which can be used in this embodiment, a material in which the phase transition between a solid and a liquid can be reversibly performed by an external stimulation may be used. For example, among compounds in which a molten state and a solidified state are reversibly changed by applying a heat stimulation (heating and cooling) across the melting point, a material which does not dissolve an in-process structural body and which is not mixed therewith may be used. In particular, when a thermoplastic is used as the shape forming material 6, as the support material 16, for example, a paraffin wax, a poly(ethylene glycol), or a low melting point fusible metal may be used. In addition, besides the materials in which the phase transition occurs by a heat stimulation, as the support material 16, for example, there may be used an ER fluid having a fluidity which is changed by an electrical signal, a magnetic fluid having a fluidity which is lost by application of a magnetic field, and an azobenzene-based compound in which a liquid state obtained by light irradiation and a solid state obtained by heating are reversibly changed.

When a thermoplastic resin is used as the shape forming material 6, and heat is applied to the support member 18 as a solid-liquid phase transition stimulation, a support member 18 having a melting point lower than that of the shape forming material 6 must be used. In the case as described above, as the support material, a poly(ethylene glycol) (PEG) may be preferably used. The reason for this is that this resin may have a desired melting point by adjusting the molecular weight thereof, and in addition, since this resin is dissolved in water, finish washing to be performed after the structural body is completed may be easily performed.

Figure 2D:
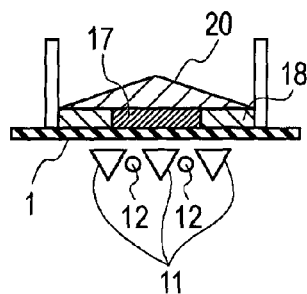
FIG. 2D is a schematic cross-sectional view showing the state of a step of the lamination process in the lamination unit according to the embodiment.

As shown in FIG. 2D, when the support material 16 is completely filled, the cross-sectional layer 14 and the support material 16 are cooled by cooling mechanisms 12, so that the first layer is formed.

Figure 2E:
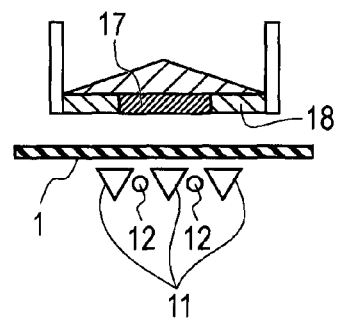
FIG. 2E is a schematic cross-sectional view showing the state of a step of the lamination process in the lamination unit according to the embodiment.

As shown in FIG. 2E, when the lamination unit is raised, a surface (hereinafter referred to as "first surface" in some cases) formed of the layer of the structural body 17 and the support member 18 is separated from the intermediate transfer member 1. This first surface is a surface functioning as a transfer surface on which a new cross-sectional layer 14 is to be laminated in a subsequent step. Since the molten support material is molded while being restricted by the surface of the intermediate transfer member 1 and the shape forming table 20, the surface (the first surface) formed of the structural body 17 and the support member 18 and located at an intermediate transfer member 1 side is aligned.

Figure 2F:
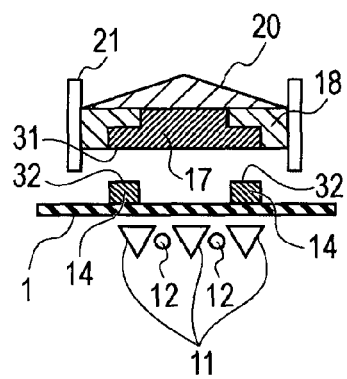
FIG. 2F is a schematic cross-sectional view showing the state of a step of the lamination process in the lamination unit according to the embodiment.

FIG. 2F shows the state after two layers are laminated to each other. A third new cross-sectional layer 14 is transported so that a second surface 32 thereof located at a side opposite to the intermediate transfer member 1 faces a first surface 31 which is formed of the support member 18 and the in-process structural body 17 supported by the shape forming table 20 and which is located at the intermediate transfer member 1 side.

Figure 2G:
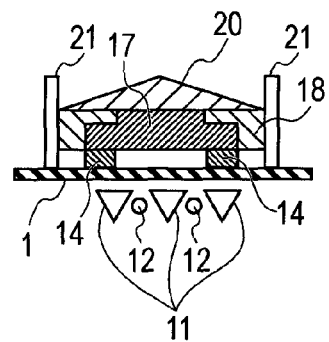
FIG. 2G is a schematic cross-sectional view showing the state of a step of the lamination process in the lamination unit according to the embodiment.

As shown in FIG. 2G, the first surface 31 and the second surface 32 are brought into contact with each other. In this step, of the first surface, the cross-sectional layer 14 is in contact with a surface formed of the in-process structural body 17. When the position in an X direction of the shape forming table 20 in the shape forming container 21 is controlled, the height of the cross-sectional layer 14 can be controlled.

Figure 2H:
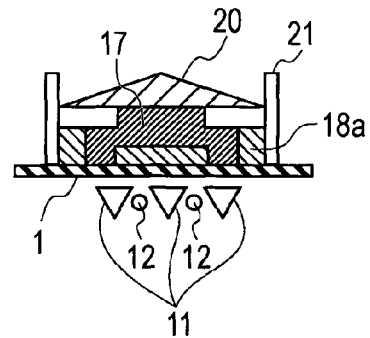
FIG. 2H is a schematic cross-sectional view showing the state of a step of the lamination process in the lamination unit according to the embodiment.

As shown in FIG. 2H, while the first surface 31 and the second surface 32 are in contact with each other, the state of the support member 18 is changed. In this step, the support member 18 is softened, and a softened support member 18a having an increased fluidity due to the softening is moved so as to reach the surface of the intermediate transfer member 1 and side surfaces of the cross-sectional layer. If the intermediate transfer member 1 is located at a lower side in a gravity direction, and the shape forming table 20 is located at an upper side in the gravity direction, the support member 18a can be moved by the use of the effect of the gravity. Alternatively, if a gas is fed inside the shape forming table 20, by the pressure thereof, the support member 18a may also be moved by a method different from that using the effect of the gravity. For the softening of the support member, the phase transition of the support member 18 is induced so as to change the fluidity thereof, and for example, depending on a material to be used, the softening can be performed by applying energy, such as heating, voltage application, or light irradiation. For example, when heating is performed by heat generated from the heaters 11, the support member 18 may be softened.

Figure 2I:
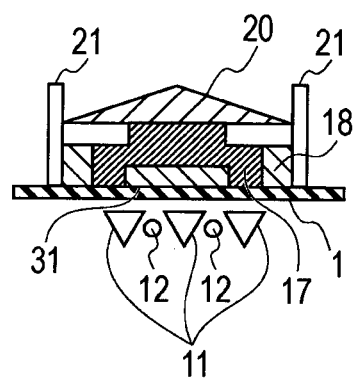
FIG. 2I is a schematic cross-sectional view showing the state of a step of the lamination process in the lamination unit according to the embodiment.

As shown in FIG. 2I, the softened support member 18a is solidified, so that support member 18 is again formed on the surface of the intermediate transfer member 1. If the support member is softened by heating, the solidification is performed by cooling. Depending on a material to be used, this step may also be performed by application of energy or by decreasing or absorbing applied energy. For example, the support member 18a softened by heating can be solidified using the cooling mechanisms 12. As described above, by the in-process structural body 17 and the solidified support member 18, a flat first surface 31 in contact with the intermediate transfer member 1 is newly formed. As described above, since the support member 18 supporting another part of the structural body 17 is moved without injecting a new support material 16, a part of the first surface 31 which supports the cross-sectional layer 14 and which functions as a transfer surface on which a new cross-sectional layer 14 is subsequently laminated can be formed.

Figure 2J:
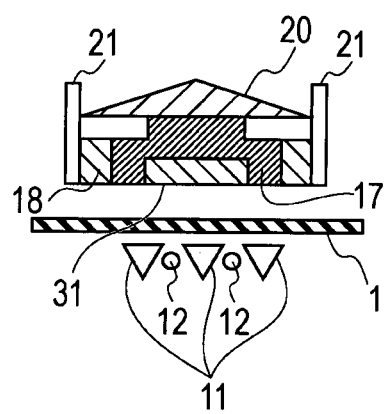
FIG. 2J is a schematic cross-sectional view showing the state of a step of the lamination process in the lamination unit according to the embodiment.

As shown in FIG. 2J, when the lamination unit is raised, the intermediate transfer member 1 is separated from the newly formed first surface 31.

In the following step, if necessary, before a cross-sectional layer 14 is brought into contact with the structural body 17, or while a cross-sectional layer 14 is in contact with the structural body 17, the support member 18 is moved to the intermediate transfer member side, and the lamination of the cross-sectional layer 14 and the structural body 17 is repeatedly performed as described above.

Figure 5A:
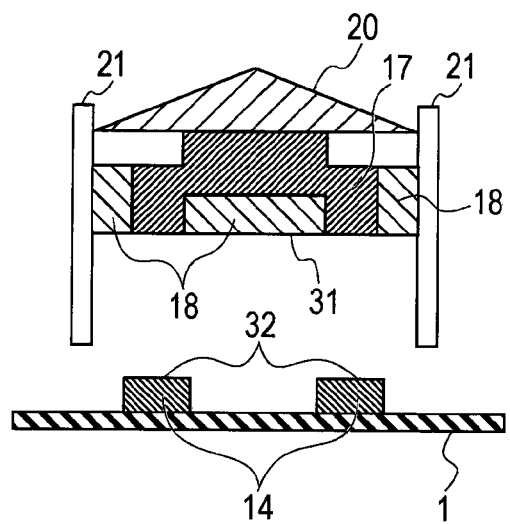
FIG. 5A is a schematic cross-sectional view showing the state of a step of the lamination process in the lamination unit according to the embodiment.
Figure 5B:
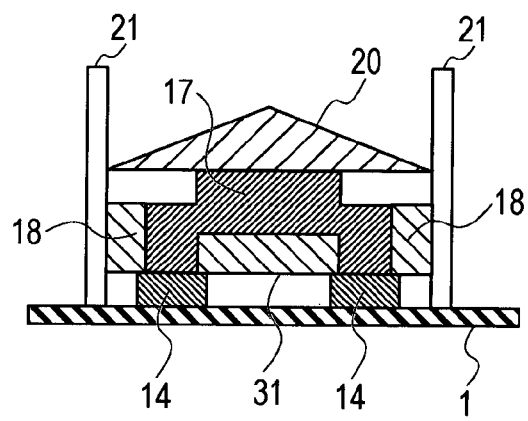
FIG. 5B is a schematic cross-sectional view showing the state of a step of the lamination process in the lamination unit according to the embodiment.
Figure 5C:
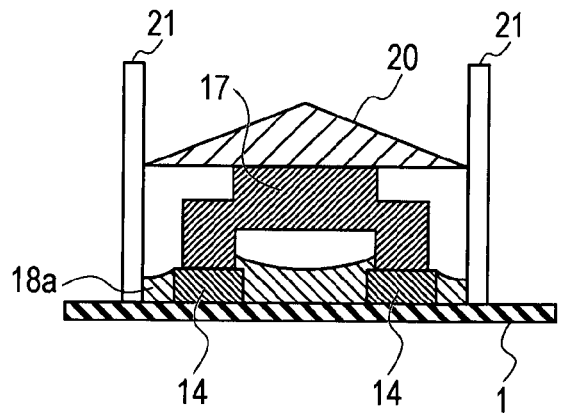
FIG. 5C is a schematic cross-sectional view showing the state of a step of the lamination process in the lamination unit according to the embodiment.
Figure 5D:
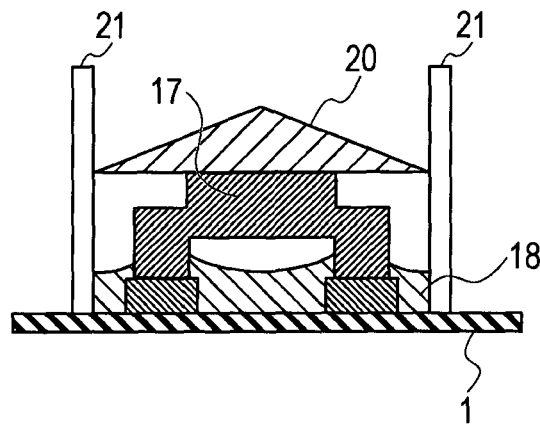
FIG. 5D is a schematic cross-sectional view showing the state of a step of the lamination process in the lamination unit according to the embodiment.
Figure 5E:
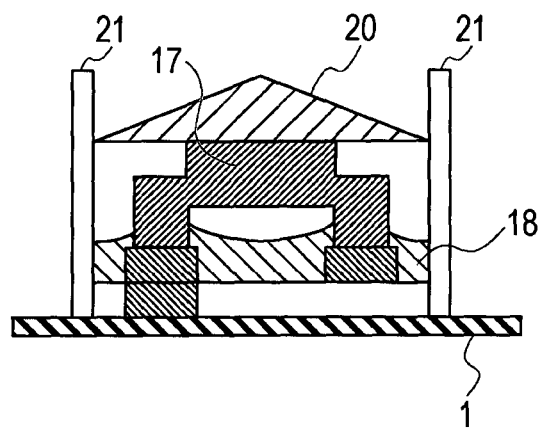
FIG. 5E is a schematic cross-sectional view showing the state of a step of the lamination process in the lamination unit according to the embodiment.
Figure 5F:
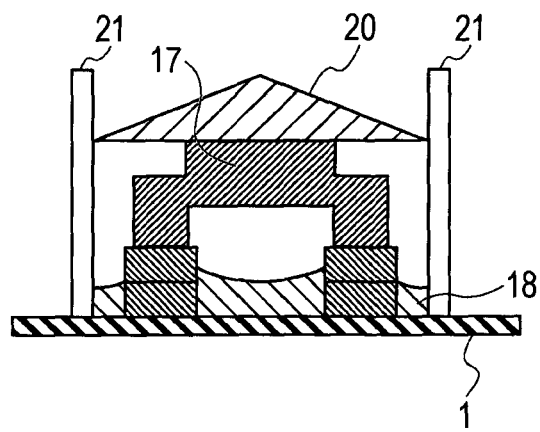
FIG. 5F is a schematic cross-sectional view showing the state of a step of the lamination process in the lamination unit according to the embodiment.

As shown in FIG. 5A, in a step following the step shown in FIG. 2J, a cross-sectional layer 14 having a second surface wider than a portion of the structural body 17 of the first surface 31 may also be laminated. The cross-sectional layer may be laminated on at least apart of the first surface, and the first surface may be formed only from the structural body. In this case, since the first surface 31 is also formed from the support member 18 before lamination, as shown in FIG. 5B, the second surface 32 of the cross-sectional layer 14 may also be brought into contact with the first surface 31 formed of the support member. According to the step as described above, the transfer can be efficiently performed. In addition, for example, following the step shown in FIG. 5B, after the support member 18 is moved as shown in FIG. 5C by softening thereof and is further solidified as shown in FIG. 5D, lamination may be further performed as shown in FIG. 5E, and subsequently, the support member 18 may also be again moved as shown in FIG. 5F by softening thereof.

In addition, instead of using the support member 18 from the beginning, the support member 18 may be used from a desired step in the above process.

Figure 6A:
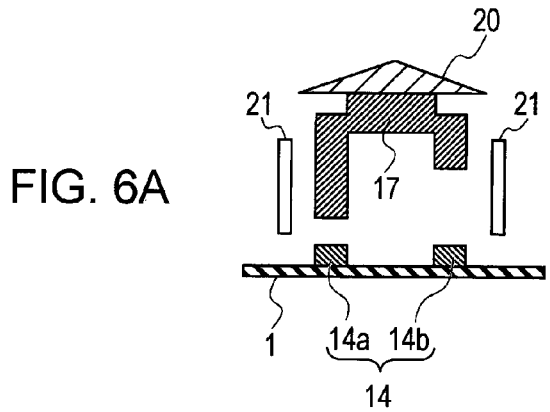
FIG. 6A is a schematic cross-sectional view showing the state of a step of the lamination process in the lamination unit according to the embodiment.
Figure 7:
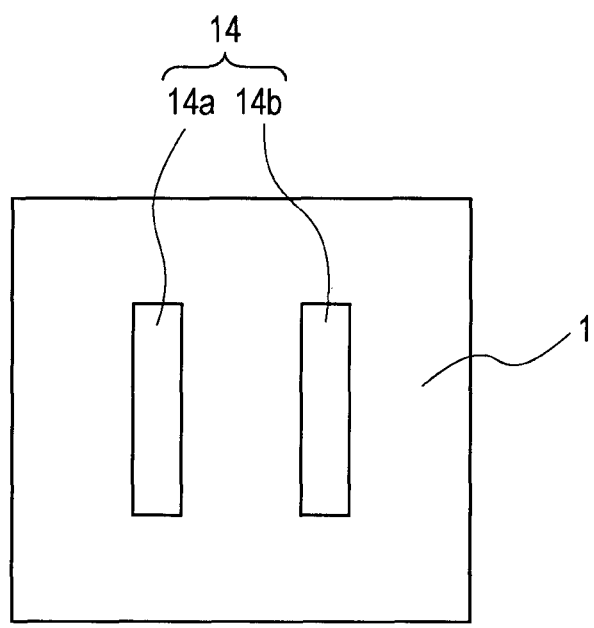
FIG. 7 is a schematic view showing the state of a step of the lamination process according to the embodiment.

As shown in FIG. 6A, a cross-sectional layer 14 which is not continuously formed on the surface of the intermediate transfer member 1 is prepared to face an in-process structural body 17. The state of the cross-sectional layer 14 viewed from a lamination unit side is shown in FIG. 7. The cross-sectional layer 14 on the intermediate transfer member 1 includes one segment 14a and the other segment 14b. The first surface functioning as a transfer surface is formed from the in-process structural body.

Figure 6B:
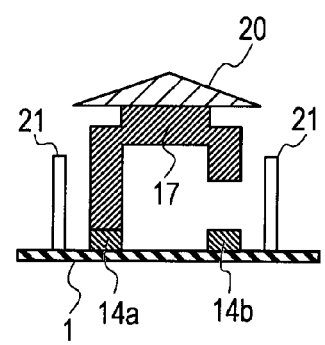
FIG. 6B is a schematic cross-sectional view showing the state of a step of the lamination process in the lamination unit according to the embodiment.

As shown in FIG. 6B, the cross-sectional layer 14 is laminated on a part of the structural body 17 which is already formed. Although the one segment 14a of the cross-sectional layer 14 is brought into contact with the structural body 17, since the other segment 14b is apart from the structural body 17 and is not in contact therewith, the intermediate transfer member 1 is the only member supporting the other segment 14b.

Figure 6C:
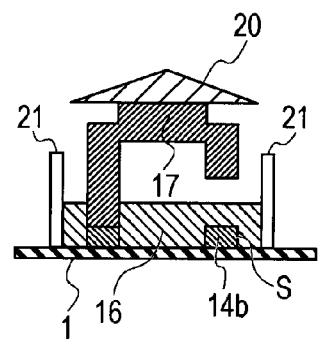
FIG. 6C is a schematic cross-sectional view showing the state of a step of the lamination process in the lamination unit according to the embodiment.

In the lamination steps from the start to that described above, lamination can be performed without a support using the support member, and in the case described above, when lamination is performed intentionally using no support member, the steps can be simplified. In this case, as shown in FIG. 6C, at the stage at which a layer which requires the support is laminated, a softened support material 16 is first injected.

Figure 6D:
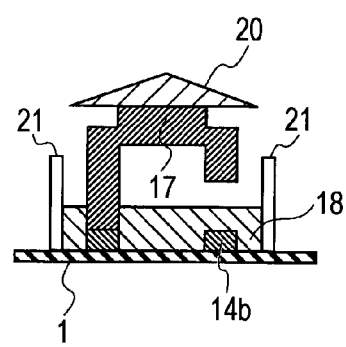
FIG. 6D is a schematic cross-sectional view showing the state of a step of the lamination process in the lamination unit according to the embodiment.

In addition, as shown in FIG. 6D, the support member 18 is solidified, so that the other segment 14b is fixed.

Figure 6E:
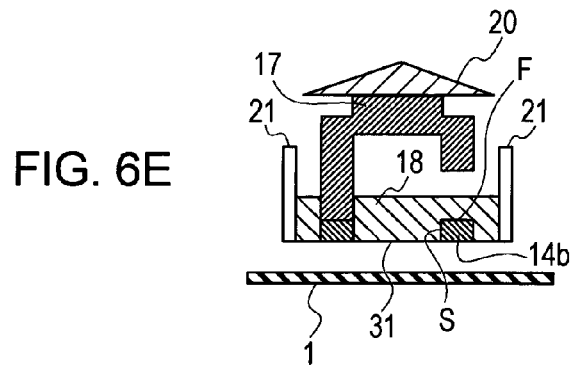
FIG. 6E is a schematic cross-sectional view showing the state of a step of the lamination process in the lamination unit according to the embodiment.

Next, as shown in FIG. 6E, the intermediate transfer member 1 is separated from the lamination unit. Since being fixed to the in-process structural body 17 by the support member 18, the other segment 14b can be moved integrally with the structural body 17. In this embodiment, since the support member 18 is also provided on a surface F of the other segment 14b opposite to the intermediate transfer member 1, compared to the case in which the other segment 14b is supported only by the side surfaces S, the bond strength between the structural body 17 and the other segment 14b is high. In addition, since the intermediate transfer member 1 is separated, a first surface 31 is exposed by the other segment 14b and the structural body 17.

Figure 6F:
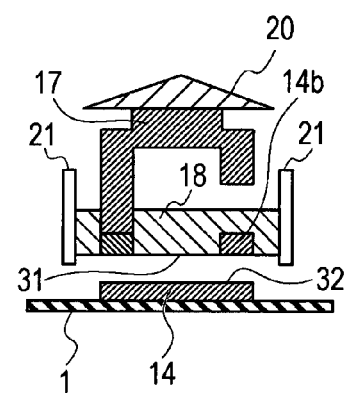
FIG. 6F is a schematic cross-sectional view showing the state of a step of the lamination process in the lamination unit according to the embodiment.

Next, as shown in FIG. 6F, the exposed first surface 31 and a second surface 32 of a new cross-sectional layer 14 are made to face each other.

Figure 6G:
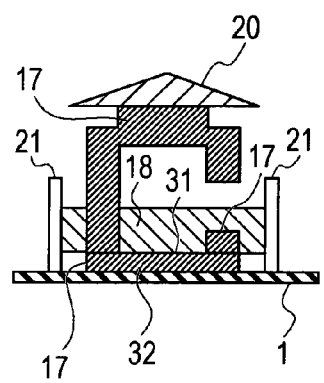
FIG. 6G is a schematic cross-sectional view showing the state of a step of the lamination process in the lamination unit according to the embodiment.

In addition, as shown in FIG. 6G, the first surface 31 and the second surface 32 are brought into contact with each other so that the in-process structural body 17, the other segment 14b integrated therewith, and the laminated new cross-sectional layer 14 are integrated together as the structural body 17, so that a continuous shape is formed.

Figure 6H:
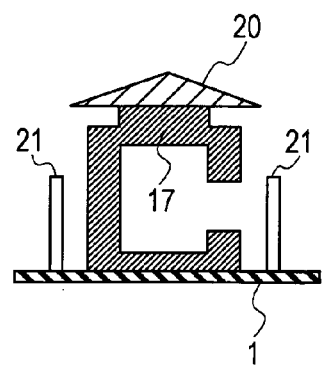
FIG. 6H is a schematic cross-sectional view showing the state of a step of the lamination process in the lamination unit according to the embodiment.

Next, as shown in FIG. 6H, the support member 18 is removed. For example, the support member 18 may be automatically removed by heating thereof. In addition, the support member 18 thus removed may also be recycled. The support member may be removed after the intermediate transfer member 1 is separated, or after being moved with the completed structural body 17 out of the lamination unit, the support member 18 may be removed in a different container.

As described above, the structural body as shown in FIG. 3 can be obtained.

Hereinafter, an example of the present invention will be descried.

Example 1

As Example 1, manufacturing of a structural body was performed by laminate formation using the apparatus shown in FIG. 1.

First, the data of the structural body could be prepared as a slice data of each layer having a predetermined thickness, and in this example, a slice data of every 100 micrometer-thick layer was used.

As the intermediate transfer member 1, a PET film was used which had a thickness of 0.4 mm and which was coated with a 0.2 mm-thick silicone rubber (trade name: KE-1310, manufactured by Shin-Etsu Chemical Co., Ltd.) having a rubber hardness of 40 degrees. In order to suppress an ink from being repelled on the surface of the intermediate transfer member 1, the intermediate transfer member 1 was processed under the following conditions by a remote-type atmospheric pressure plasma treatment apparatus (trade name: APT-203 rev., manufactured by Sekisui Chemical Co., Ltd.) for surface modification.

[Surface Modification Conditions]

Flow rate of gas type: 1,000 cc/m of air, 6,000 cc/min of $N_2$

Input voltage: 230 V
Frequency: 10 kHz
Treatment rate: 100 mm/min

Next, in order to suppress an ink from spreading over the intermediate transfer member 1, a reaction solution having the following formula was applied using a nozzle of an ink jet head to a position corresponding to a cross-sectional pattern forming the cross-sectional layer 14.

[Formula of Reaction Solution]

$$Ca(NO_3)_2 \cdot 4H_2O: 50 \text{ parts by mass} \quad \text{[Math. 1]}$$

Surfactant (trade name: Acetylanol EH, manufactured by Kawaken Fine Chemicals Co., Ltd.): 1 part by mass Diethylene glycol: 9 parts by mass
Purified water: 40 parts by mass Next, the ink pattern 4 of a cross-section of the structural body was formed on the intermediate transfer member by applying a color ink having the following formula using a different nozzle of the ink jet head.

[Ink Composition]

Following pigment: 3 parts by mass

Black: carbon black (trade name: MCF 88, manufactured by Mitsubishi Chemical Corp.), Cyan: Pigment Blue 15, Magenta: Pigment Red 7, Yellow: Pigment Yellow 74

Styrene-acrylic acid-ethyl acrylate copolymer (acid value: 240, weight average molecular weight: 5,000): 1 part by mass Glycerin: 10 parts by mass
Ethylene glycol: 5 parts by mass
Surfactant (trade name: Acetylanol EH, manufactured by Kawaken Fine Chemicals Co., Ltd.): 1 part by mass
Purified water: 80 parts by mass Next, polypropylene particles (average particle diameter: 200 micrometers) functioning as the shape forming material 6 was supplied to an ink image 14 on the intermediate transfer member 1 by a blade coater functioning as the shape forming material supply mechanism 5.

Next, deelectrified air was blown from the air knife 8 at a wind velocity of 30 m/s to the intermediate transfer member 1, so that the shape forming material 6 outside of the ink image was removed.

Next, heating was performed by the heaters 11 from the rear surface of the intermediate transfer member 1, and the mixture 7 of the ink, the reaction solution, and the shape forming material 6 was melted at approximately 170 degrees centigrade and was formed into a film, so that a flat cross-sectional layer 14 was formed.

Next, after the cross-sectional layer 14 was transported to the position of the shape forming table 20 (FIG. 2A) and was placed at a predetermined position, the shape forming table 20 was lowered to a position at which the gap to the surface of the intermediate transfer member 1 was 100 micrometers, so that the surface of the shape forming table 20 was brought into contact with the cross-sectional layer 14 (FIG. 2B).

Next, a support material (PEG 2000 (poly(ethylene glycol)), weight average molecular weight: 2,000) was melted at approximately 70 degrees centigrade and was filled between the shape forming table 20 and the intermediate transfer member 1 (FIG. 2C).

Next, the cross-sectional layer 14 and the support material 16 were cooled to 20 degrees centigrade and solidified by circulating cold water in the cooling mechanisms 12 provided at the rear surface of the intermediate transfer member 1, so that the structural body 17 and the support member 18 were obtained (FIG. 2D).

Next, the shape forming table 20 was raised together with the structural body 17 and the support member 18 (FIG. 2E), so that the first layer was completed.

Hereinafter, 50 cross-sectional layers were repeatedly laminated to each other, and the height (thickness) of the in-process structural body 17 became 5 mm. During the steps described above, whenever necessary, the support member 18 was melted at 70 degrees centigrade so as to drop on the surface of the intermediate transfer member 1 (FIG. 6C) and was then solidified by cooling at 20 degrees centigrade (FIG. 6D), so that a surface layer at the intermediate transfer member 1 side obtained after the transfer was made to be a smooth surface formed of the structural body 17 and the support member 18.

When the operation described above is repeatedly performed, and lamination was performed totally 1,000 times, a laminate having a height of 10 cm was formed (FIG. 6G).

After the last layer was laminated, before the shape forming table 20 was raised, the molten support member 18 was automatically removed by suction and discharge using the support member filling mechanism 15 (FIG. 6H). Subsequently, the structural body was brought out of the shape forming table.

In the structural body obtained as described above, a support member residue and delamination were not observed which were caused by the heat history during the lamination steps, the change with time, and the inclination between the cross-sectional layer and the transfer surface in lamination.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-272625, filed Dec. 13, 2012, which is hereby incorporated by reference herein in its entirety.

The invention claimed is:

1. A method for manufacturing a structural body, the method comprising:
    a lamination step of, while an in-process structural body is supported by a support member, laminating a plurality of times, a layer which is provided on a surface of a transfer member and which is to be formed into the structural body on the in-process structural body or at least a part of a surface formed of the in-process structural body and the support member,
    wherein in the lamination step, the support member is moved by changing the state thereof.

2. The method according to claim 1, wherein among the plurality of laminations in the lamination step, between a predetermined number-th lamination and a lamination following the predetermined number-th lamination, the support member is moved.

3. The method according to claim 1, wherein the change in the state is softening.

4. The method according to claim 3, wherein the lamination step comprises:
    a substep of, while the in-process structural body is supported by the support member, bringing a second surface of the layer which is provided on the surface of the transfer member and which is to be formed into the structural body, the second surface being located opposite to the transfer member, into contact with the in-process structural body or at least a part of a first surface formed of the in-process structural body and the support member;
a substep of moving the support member to reach the surface of the transfer member by softening the support member while the first surface and the second surface are in contact with each other;
a substep of solidifying the moved support member; and
a substep of transferring the layer which is to be formed into the structural body to the in-process structural body or the solidified support member by removing the transfer member from the support member after the support member is solidified.

5. The method according to claim 4, wherein the lamination step further comprises:
a substep of bringing the surface of the support member exposed by removing the transfer member from the support member into contact with a surface of a further layer which is provided on the surface of the transfer member and which is to be formed into the structural body, the surface of the further layer being located opposite to the transfer member.

6. The method according to claim 4,
wherein when the layer which is to be formed into the structural body includes one segment and the other segment which are provided on the surface of the transfer member so as to be apart from each other,
in the substep of bringing the second surface into contact with the at least a part of the first surface, the support member is placed at a position apart from the transfer member than the first surface, the one segment of the layer which is to be formed into the structural body is set in contact with a part of the first surface formed of the in-process structural body, and the other segment is placed apart from the in-process structural body, and
in the substep of moving the support member, the support member is moved to reach side surfaces of the other segment.

7. The method according to claim 6,
wherein in the substep of moving the support member, the support member is moved so as to be in contact with the surface of the other segment opposite to the transfer member.

8. The method according to claim 4,
wherein the support member is a material to be softened by heating, and in the substep of moving the support member, the support member is softened by heating thereof.

9. The method according to claim 8,
wherein the support member includes a metal.

10. The method according to claim 8,
wherein the support member includes a poly(ethylene glycol) or a paraffin wax.

11. The method according to claim 4,
wherein the support member is formed of a material which is softened by light irradiation and which is solidified by heating.

12. An apparatus for manufacturing a structural body, the apparatus comprising:
a lamination device which, while an in-process structural body is supported by a support member, laminates a plurality of times, a layer which is provided on a surface of a transfer member and which is to be formed into the structural body on the in-process structural body or at least a part of a surface formed of the in-process structural body and the support member; and
a changing device changing the state of the support member so as to move the support member in the lamination device.

13. The apparatus according to claim 12,
wherein among the plurality of laminations, the lamination device moves the support member between a predetermined number-th lamination and a lamination following the predetermined number-th lamination.

14. The apparatus according to claim 12,
wherein the change in the state is softening.

15. The apparatus according to claim 14,
wherein while the in-process structural body is supported by the support member, the lamination device brings a second surface of the layer which is provided on the surface of the transfer member and which is to be formed into the structural body, the second surface being located opposite to the transfer member, into contact with the in-process structural body or at least a part of a first surface formed of the in-process structural body and the support member,
the changing device softens the support member while the first surface and the second surface are in contact with each other so as to move the support member to reach the surface of the transfer member and solidifies the moved support member, and after the support member is solidified by the changing device, the lamination device transfers the layer which is to be formed into the structural body on the in-process structural body or the solidified support member by removing the transfer member from the support member.

16. The apparatus according to claim 12,
wherein the support member is a material which is softened by heating, and the changing device softens the support member by heating thereof.

17. The apparatus according to claim 16,
wherein the support member includes a metal.

18. The apparatus according to claim 16,
wherein the support member includes a poly(ethylene glycol) or a paraffin wax.

19. The apparatus according to claim 12,
wherein the support member is formed of a material which is softened by light irradiation and which is solidified by heating.

* * * * *